(12) United States Patent
Johnson

(10) Patent No.: US 8,457,440 B1
(45) Date of Patent: Jun. 4, 2013

(54) METHOD AND SYSTEM FOR BACKGROUND SUBTRACTION IN MEDICAL OPTICAL COHERENCE TOMOGRAPHY SYSTEM

(75) Inventor: Bartley C. Johnson, North Andover, MA (US)

(73) Assignee: Axsun Technologies, Inc., Billerica, MA (US)

( * ) Notice: Subject to any disclaimer, the term of this patent is extended or adjusted under 35 U.S.C. 154(b) by 553 days.

(21) Appl. No.: 12/695,029

(22) Filed: Jan. 27, 2010

Related U.S. Application Data

(60) Provisional application No. 61/147,592, filed on Jan. 27, 2009.

(51) Int. Cl.
*G06K 9/40* (2006.01)

(52) U.S. Cl.
USPC ........... 382/275; 382/128; 382/260; 382/274; 358/3.26; 358/3.27; 358/463

(58) Field of Classification Search
USPC . 382/128, 131, 132, 274, 275, 260; 358/3.26, 358/3.27, 463
See application file for complete search history.

(56) References Cited

U.S. PATENT DOCUMENTS

| | | | | |
|---|---|---|---|---|
| 6,516,209 | B2 * | 2/2003 | Cheng et al. | 600/323 |
| 6,735,458 | B2 * | 5/2004 | Cheng et al. | 600/323 |
| 6,849,844 | B2 * | 2/2005 | Khoury | 250/208.1 |
| 6,937,884 | B1 * | 8/2005 | Barbour | 600/473 |
| 7,197,355 | B2 * | 3/2007 | Nelson | 600/425 |
| 7,415,049 | B2 | 8/2008 | Flanders et al. | |
| 7,617,080 | B2 * | 11/2009 | Barbour et al. | 703/2 |
| 7,623,728 | B2 * | 11/2009 | Avinash et al. | 382/275 |
| 7,680,314 | B2 * | 3/2010 | Hong | 382/131 |
| 7,738,945 | B2 * | 6/2010 | Fauver et al. | 600/425 |
| 2009/0290167 | A1 | 11/2009 | Flanders et al. | |

OTHER PUBLICATIONS

Drexler, W., et al., editors, "Optical Coherence Tomography: Technology and Applications" Book, Springer-Verlag New York, LLC, ISBN: 9783540775492, pp. 189-196, Oct. 2008.
U.S. Appl. No. 12/553,295, filed Sep. 3, 2009, by Flanders et al.

* cited by examiner

*Primary Examiner* — Yosef Kassa
(74) *Attorney, Agent, or Firm* — Houston & Associates, LLP

(57) ABSTRACT

A method for coherence noise filtering in an optical coherence tomography system comprises generating a background image containing coherence noise, generating a sample image, generating composite pixel values from pixel values in the background image based on the mean pixel values from lines in the background image, and subtracting the composite pixel values from complex pixel values in the sample image.

17 Claims, 6 Drawing Sheets

METHOD AND SYSTEM FOR BACKGROUND SUBTRACTION IN MEDICAL OPTICAL COHERENCE TOMOGRAPHY SYSTEM

RELATED APPLICATIONS

This application claims the benefit under 35 USC 119(e) of U.S. Provisional Application No. 61/147,592, filed on Jan. 27, 2009, which is incorporated herein by reference in its entirety.

BACKGROUND OF THE INVENTION

Coherence analysis relies on the use of the interference phenomena between a reference wave and an experimental wave or between two parts of an experimental wave to measure distances and thicknesses, and calculate indices of refraction of a sample. Optical Coherence Tomography (OCT) is one example technology that is used to perform usually high-resolution cross sectional imaging. It is applied to imaging biological tissue structures, for example, on microscopic scales in real time. Optical waves are reflected from the tissue, in vivo, ex vivo or in vitro, and a computer produces images of cross sections of the tissue by using information on how the waves are changed upon reflection.

The original OCT imaging technique was time-domain OCT (TD-OCT), which used a movable reference mirror in a Michelson interferometer arrangement. More recently, Fourier domain OCT (FD-OCT) techniques have been developed. One example uses a wavelength swept source and a single detector; it is sometimes referred to as time-encoded FD-OCT (TEFD-OCT) or swept source OCT. Another example uses a broadband source and spectrally resolving detector system and is sometimes referred to as spectrum-encoded FD-OCT or SEFD-OCT.

In scanning OCT, a light beam is focused onto the sample under test by a probe. Returning light is combined with light from a reference arm to yield an interferogram, providing A-scan or Z axis information. By scanning the sample relative to the probe, linear or two dimensional scans can be used to build up a volumetric image. One specific application involves the scanning of arteries, such as coronary arteries. The probe is inserted to an artery segment of interest using a catheter system. The probe is then rotated and drawn back through the artery to produce a helical scan of the inner vessel wall.

In the Fourier domain OCT, the axial structure of the sample is reconstructed by applying an inverse Fourier transform to the detected fringe signal. Through the scanning process, the axial structure at each point is combined into to generate a three-dimensional image of that sample.

When looking at cross sections through the three-dimensional image, various types of artifacts become evident, typically exhibited by narrow streaks or bands across the image. These streaks are typically caused by small, unwanted but hard to remove, stray reflections in the system. One example of an artifact-causing reflection is the small reflection from a detector window, but many other sources of unwanted reflections are possible. Instead of eliminating these reflection sources directly, in many cases it may be convenient or necessary to remove the artifact from the image through signal processing, i.e. background subtraction.

SUMMARY OF THE INVENTION

The problem with these previous approaches is two fold. On one hand, simple background image subtraction fails to take into account phase information that is important for some OCT analysis techniques such as Doppler velocity extraction. On the other hand, image background subtraction fails to account for instabilities in the background noise image due to phase wandering between the generation of the background image and the sample image.

In general, according to one aspect, the invention features, a method for coherence noise filtering in an optical coherence tomography system. The method comprises generating a background image containing coherence noise, generating a sample image, generating composite pixel values from pixel values in the background image, and subtracting the composite pixel values from pixel values in the sample image.

In embodiments, the step of generating the background image comprises taking a background scan with a light block in the optical coherence tomography system and generating the background image by performing an inverse Fourier transform on scan data from the scan of the light block.

In other embodiments, the step of generating the background image comprises cross-correlating different images generated by the optical coherence tomography system.

Typically, the step of generating the sample image comprises the optical coherence tomography system scanning an optical signal over a sample to generate sample scan fringe data and generating the sample image by performing an inverse Fourier transform on sample scan fringe data.

In the preferred embodiment, the step of generating the composite pixel values comprises taking averages of the pixel values for lines of the background image. The step of subtracting the composite pixel values from pixel values in the sample image comprises generating a corrected sample image by subtracting the magnitude of the composite pixel values from magnitudes of the pixel values in the sample image and leaving a phase of the pixel values in the sample image substantially unchanged.

In some embodiments, further processing is performed on the corrected sample image based on the phase of the pixel values, such as Doppler velocity extraction.

In general, according to another aspect, the invention features an optical tomography system. This system comprises a wavelength swept optical source for generating a tunable optical signal and an interferometer for transmitting the tunable optical signal from the wavelength swept optical source to a sample arm and reference arm and combining the optical signals from the sample arm and the reference arm to generate an interference signal. A processing system samples the interference signal to generate a sample image and a background image, generates composite pixel values from pixel values in the background image, and subtracts the composite pixel values from pixel values in the sample image.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
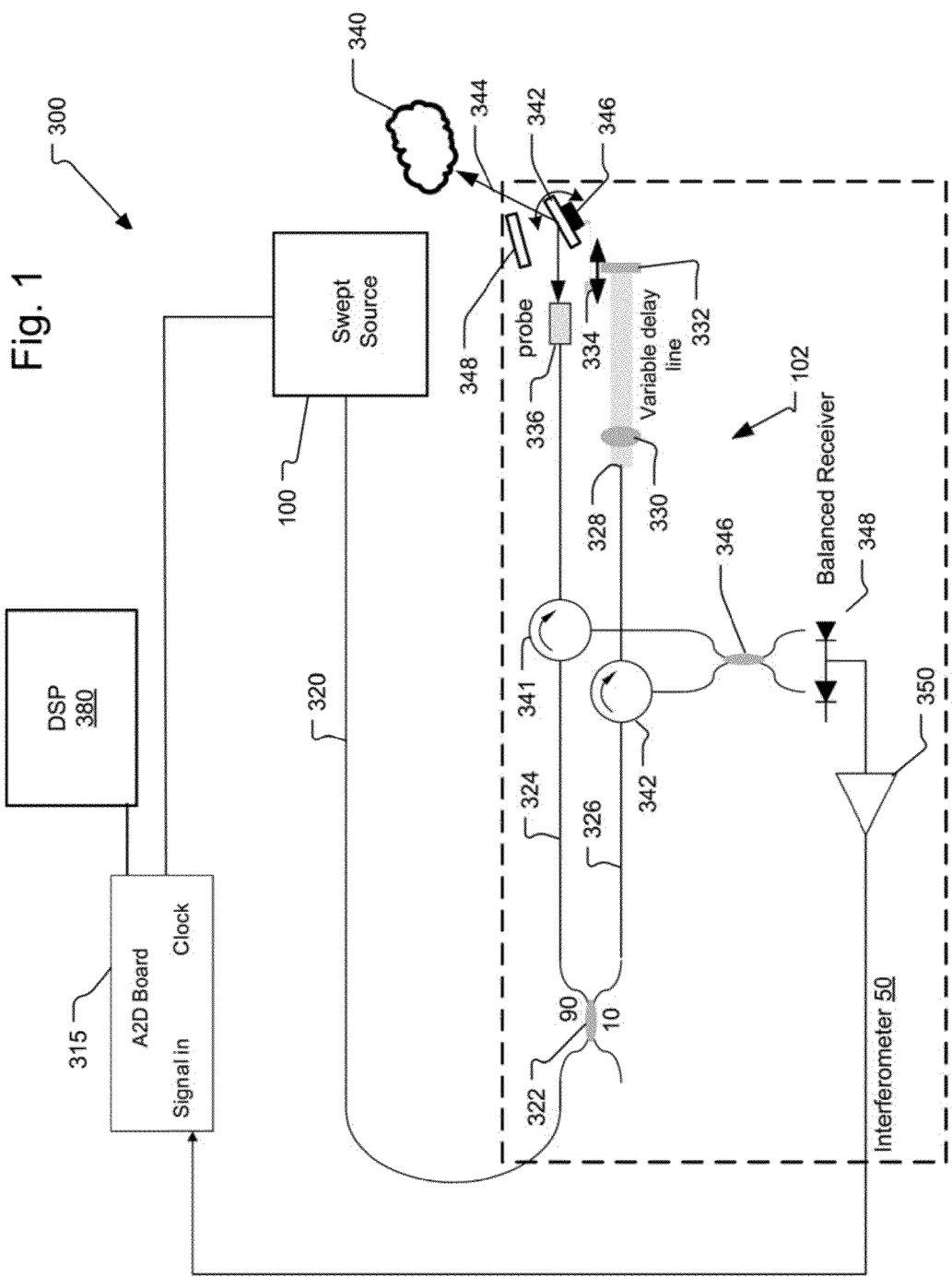
FIG. 1 is a schematic view of an swept source OCT system according to the invention.

FIG. 1 shows an optical coherence analysis system 300 using the swept source 100, which has been constructed according to the principles of the present invention.

A swept source 100 generates a narrowband swept, tunable optical signal that is spectrally scanned over a scan band. In one embodiment, the swept source is based on a tunable amplified spontaneous emission (ASE) source as described in U.S. patent application Ser. No. 12/553,295, now U.S. Pat. Appl. Publ. No. US 2011/0051148 A1, entitled Filtered ASE Swept Source for OCT Medical Imaging, filed on Sep. 3, 2009 by Flanders, et al., which is incorporated herein by this reference in its entirety. In other examples, the swept source is based on a laser device as disclosed in U.S. Pat. No. 7,415,049 B1, entitled Laser with Tilted Multi Spatial Mode Resonator Tuning Element, by Flanders, et al., which is incorporated herein by this reference in its entirety. Still another option is a swept source with integrated clock as disclosed in U.S. patent application Ser. No. 12/396,099, now U.S. Pat. Appl. Publ. No. US 2009/0290167A1, filed on Mar. 2, 2009, entitled Optical Coherence Tomography Laser with Integrated Clock, by Flanders, et al., which is also incorporated herein by this reference in its entirety.

In more detail, a Michelson interferometer 50 is used to analyze the optical signals from the sample 340. The tunable signal from the swept source module 100 is output on fiber 320 to a 90/10 optical coupler 322. The tunable signal is divided by the coupler 322 between a reference arm 326 and a sample arm 324 of the system.

The optical fiber of the reference arm 326 terminates at the fiber endface 328. The light exiting from the reference arm fiber endface 328 is collimated by a lens 330 and then reflected by a mirror 332 to return back.

The external mirror 332 has an adjustable fiber to mirror distance (see arrow 334). This distance determines the depth range being imaged, i.e. the position in the sample 340 of the zero path length difference between the reference arm 326 and the sample arm 324. The distance is adjusted for different sampling probes and/or imaged samples. Light returning from the reference mirror 332 is returned to a reference arm circulator 342 and directed to a 50/50 fiber coupler 346.

The fiber on the sample arm 324 terminates at the sample arm probe 336. The exiting light 344 is focused by the probe 336 onto the sample 340. An intervening scanning mirror 342 is used to scan the light 344 over the sample 340. In particular, a mirror scanner 346 is used to raster scan over the sample 340 in one implementation. In other examples, the probe 336 is moved relative to the sample. In the example of intravascular scanning, the probe 336 is both rotated and pulled back within the vessel or other lumen to helically scan the inner walls of the vessel or other lumen.

Light returning from the sample 340 is returned to a sample arm circulator 341 and directed to the 50/50 fiber coupler 346. The reference arm signal and the sample arm signal are combined in the fiber coupler 346. The combined/interference signal is detected by a balanced receiver, comprising two detectors 348, at each of the outputs of the fiber coupler 346. The electronic interference signal from the balanced receiver 348 is amplified by amplifier 350.

A processing system includes an analog to digital converter system 315, which is used to sample the interference or fringe signal output from the amplifier 350. Frequency clock and sweep trigger signals derived from the swept source are used by the A2D board 315 to synchronize system data acquisition with the frequency tuning of the swept source.

Once a complete fringe data set has been collected from the sample 340 by spatially raster scanning the focused probe beam point over the sample, in a Cartesian geometry x-y fashion or a cylindrical geometry theta-z fashion, and the spectral response at each one of these points is generated from the frequency tuning of the swept source 100, the digital signal processor (DSP) 380 of the processing system performs an inverse Fourier transform on the data in order to reconstruct the image and thus perform a 2D or 3D tomographic reconstruction of the sample 340. This information generated by the digital signal processor 380 is then displayed on a video monitor.

In the preferred embodiment, a beam block 348 is provided. During a background image mode, the light 344 is directed at this beam block in order to generate a background image. This background image preferably only contains the coherence noise generated by light scanning from the optical elements within the optical coherence analysis system 300.

Figure 2:
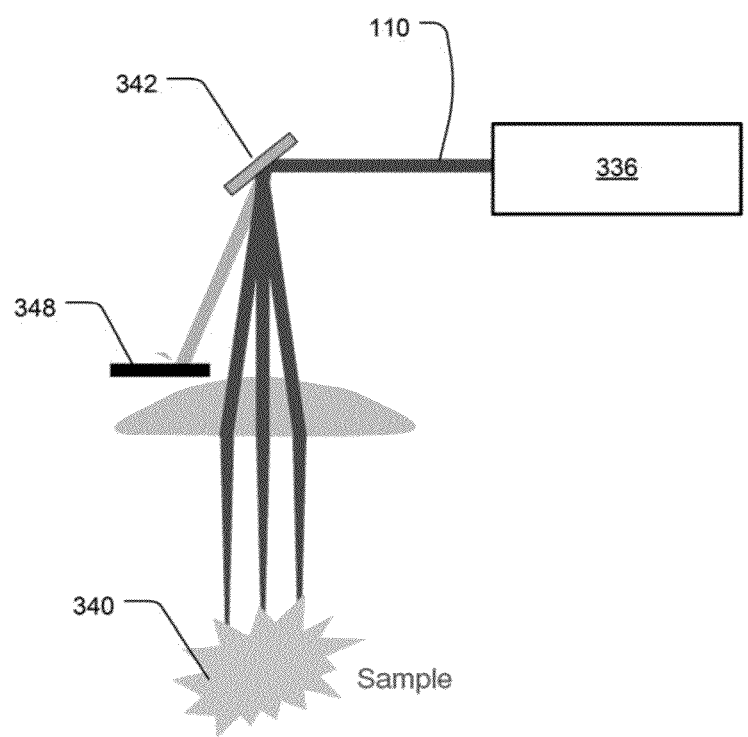
FIG. 2 is a schematic diagram showing the OCT scanning system and light block used to generate a background image.

FIG. 2 shows the operation of the beam block 348 in more detail. In the example using a scanning mirror 342, periodically, the scanning mirror 342 directs the optical signal 344 at the beam block 348. This is preferably a highly absorbing optical element that generates little or no optical feedback into the probe. As a result, the image generated by the DSP 380 from the fringe data from the scan of the beam block 348 is entirely or almost entirely generated by the coherent noise within the system 300.

In alternative embodiment, the background image is generated by cross-correlating different images generated by the optical coherence tomography system such as different images of the sample by the DSP 380. Since the coherence noise is stationary or nearly within these series of images, the cross-correlation of the images yields a background image due to the coherence noise sources.

Figure 3:
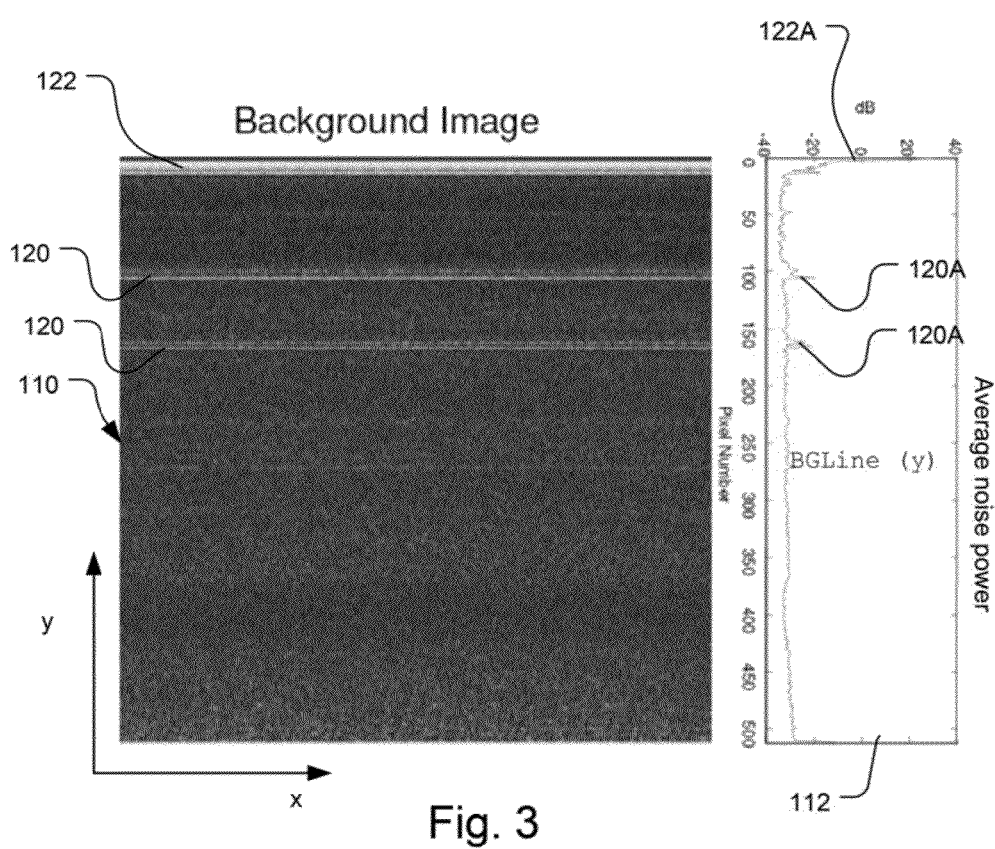
FIG. 3 shows an exemplary background image along with a plot of mean pixel values for each line in the background image.

FIG. 3 is an example of a background image 110 generated when the scanning mirror 342 directs the optical signal 344 at the beam block 348. The background image 110 is characterized by the first A-line 122 and several horizontal bands 120 extending across the image 100. These bands are generated by coherence noise from the interference of light waves that were scattered by optical elements within the OCT system 300.

Figure 4A:
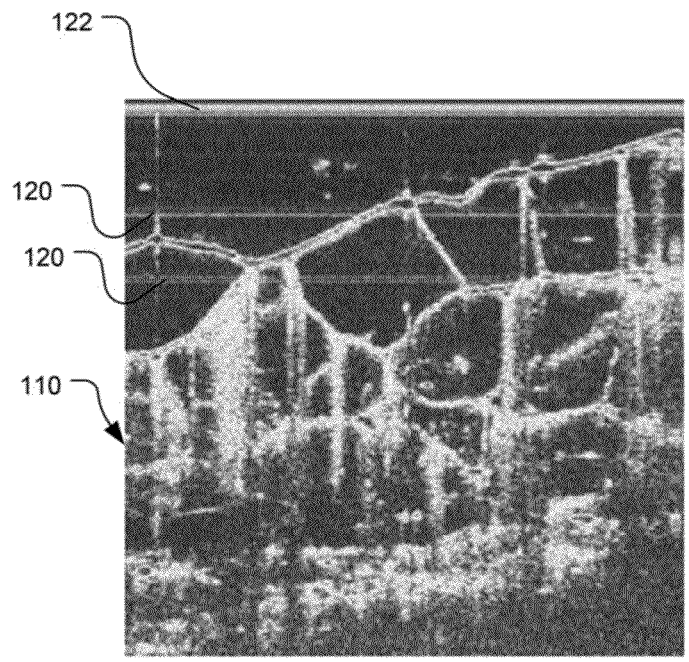
FIGS. 4A and 4B show a raw sample image IM and a corrected sample image CIM generated using the present invention, respectively.

FIG. 4A is an example of an image 105 of a sample 340, here foam. The horizontal band artifacts 120 are overlaid onto image of the A-scan image of the sample.

One approach to background subtraction is to retain the phase information in the inverse fast Fourier transform (IFFT) of the background and image signals before subtracting. This, in principle, can fully eliminate the banded artifacts assuming an optical system that is extremely mechanically and thermally stable. This process can be useful in cleaning up low-frequency patterns, but is generally not effective for artifacts that appear at large depths. At larger depths, this type of background subtraction results in a dotted artifact line as the phase of the image drifts, leading to constructive or destructive interference. The other problem with this method is that the noise floor is raised by 3 dB since two equally noisy signals are being subtracted.

Subtracting the IFFT magnitudes (throwing away the phase) of image and background signals is more effective under mechanical and thermal perturbation, if less exact. Another enhancement to this method is that the background A-line that is subtracted from each image A-line can be the average of many background A-line magnitudes, providing a less speckly subtraction. This subtraction occurs before logarithmically scaling the image into a gray-scale bitmap image for display.

Figure 5A:
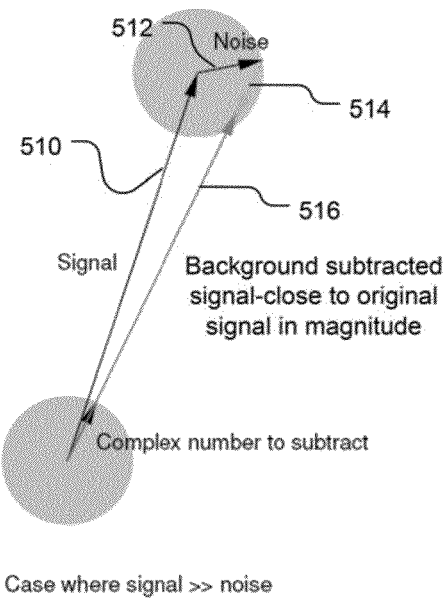
FIGS. 5A and 5B illustrate the relationship between the signal and the noise components for exemplary pixel values when the signal is much greater than the noise and when the noise is much greater than the signal, respectively.
Figure 5B:
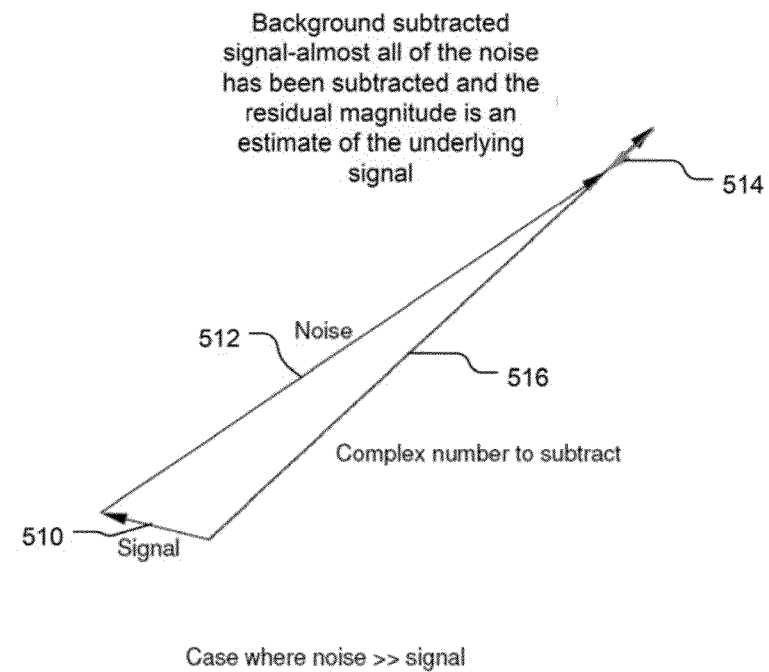

FIGS. 5A and 5B illustrate one embodiment for background noise correction. FIG. 5A shows the example where the signal is much greater than the noise. FIG. 5B shows the example where the noise is much greater than the signal.

As illustrated in FIGS. 5A and 5B, each pixel in an A-scan image is the vector sum of the signal 510 and "noise" 512. The "noise" 512 may be actual random noise, or just a spurious signal present in the background scan. The magnitude of the "noise" is known from the background scan (see FIG. 3), but not the phase. Only the phase of the signal+noise is known. The procedure is to subtract a complex number 514 from each pixel whose magnitude is obtained from a background scan and whose phase is equal to the phase of the signal+noise. This yields the corrected pixel magnitude 516 while also preserving the phase information for corrected pixel.

Figure 6:
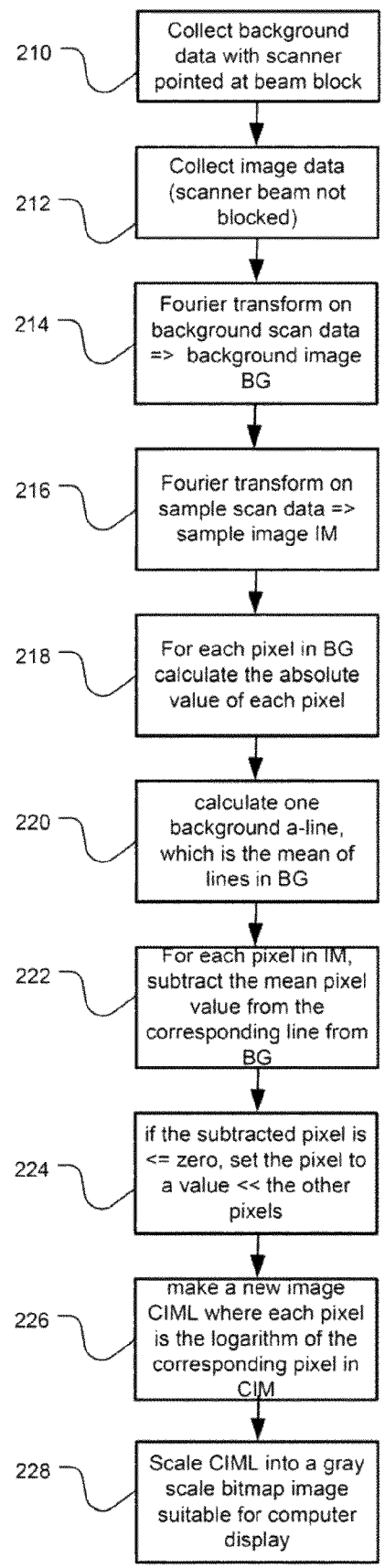
FIG. 6 is a flow diagram illustrating the process for generating the corrected sample image CIM from the raw sample image IM using the background image BC.

FIG. 6 illustrates a process for correcting a scan of a sample based on a background scan.

In more detail, in step 210, the background scan fringe data is first collected. In one example, the beam block is used. Then, the sample scan fringe data is collected in step 212. As described above, these sample data are generated by scanning the sample 336 relative to the probe head 340. The sample fringe data are generated by scanning over a beam block or with a block inserted in the optical path of the OCT system downstream of the system's coherence noise sources.

In step 214, a Fourier transform is performed on the background scan fringe data. This yields a complex background image BG (x,y). Similarly, in step 216, a Fourier transform is performed on the sample scan fringe data. This yields a complex raw sample image IM (x,y).

In step 218, an absolute value is calculated for each pixel in the background image BG to generate a two dimensional image ABS(BG (x,y)). This absolute value, which is calculated for each pixel, is the magnitude of the pixel, throwing away the phase.

The two dimensional matrix of the absolute values for each pixel in the background image ABS(BG (x,y)) is used to calculate a mean or average pixel magnitude for each line in the background image BG, in step 220. This generates a one dimensional array: BGLine (y). The pixel values held in BGLine (y) are termed composite pixel values because they are calculated based on multiple pixel values from the corresponding line in the background image.

Referring back to FIG. 3, an exemplary background image 110 is illustrated. Next to the background image 110 is a plot 112 of BGLine (y), which contains the mean pixel values for each horizontal line of pixels within the background image 110. As a result, each horizontal band artifact 120 corresponds to a peak 120A in the corresponding mean pixel value for that line as illustrated in plot 112.

Returning to FIG. 6, in step 222, for each pixel in the raw image IM (x, y), the mean pixel value for the corresponding line is subtracted from the magnitude of the pixel, yielding background corrected image CIM (x, y): CIM (x, y)=abs(IM (x,y))−BGLine (y).

In the preferred embodiment, the subtraction only changes the magnitude of the complex number that characterizes the pixel magnitude and phase. The phase angle is unchanged by the subtraction. If only an image is to be generated, then the phase information can be removed. However in some embodiments further processing is performed using the phase information included in CIM (x,y). In one specific example, Doppler velocity extraction is performed by the DSP on the corrected sample image based on the phase of the pixel values.

OCT images are generally logarithmically scaled before converting to a gray-scaled bitmap computer image, see step 226, to make a new image CIML. Prior step 224 prevents taking the logarithm of a negative number without disturbing the image. Image CIML is scaled into a gray scale bitmap image suitable for computer display in step 228.

Figure 4B:
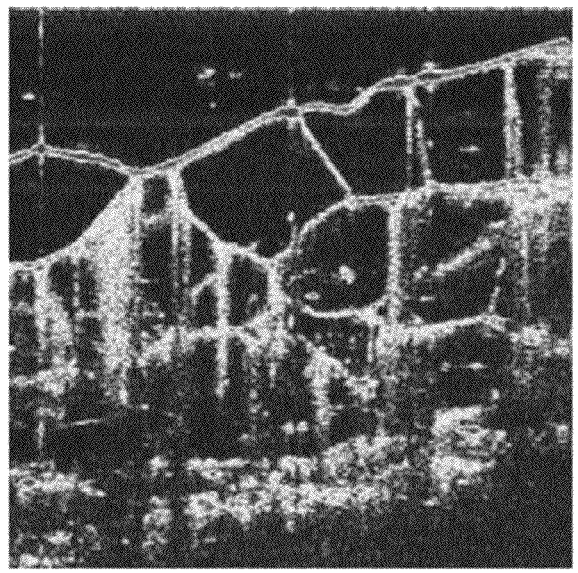

FIG. 4B shows the corrected image CIML (x, y) based on the uncorrected image shown in FIG. 4A IM (x, y).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for coherence noise filtering in an optical coherence tomography system, the method comprising:
generating a background image containing coherence noise;
generating a sample image;
generating composite pixel values from pixel values in the background image; and
subtracting the composite pixel values from pixel values in the sample image by generating a corrected sample image by subtracting the magnitude of the composite pixel values from magnitudes of the pixel values in the sample image and leaving a phase of the pixel values in the sample image substantially unchanged.

2. A method as claimed in claim 1, further comprising performing further processing on the corrected sample image based on the phase of the pixel values.

3. A method as claimed in claim 1, further comprising performing Doppler velocity extraction of the corrected sample image based on the phase of the pixel values.

4. A method for coherence noise filtering in an optical coherence tomography system, the method comprising:
generating a background image containing coherence noise by taking a background scan with a light block in the optical coherence tomography system and generating the background image by performing an inverse Fourier transform on scan data from the scan of the light block;
generating a sample image;
generating composite pixel values from pixel values in the background image; and
subtracting the composite pixel values from pixel values in the sample image.

5. A method for coherence noise filtering in an optical coherence tomography system, the method comprising:
   generating a background image containing coherence noise by cross-correlating different images generated by the optical coherence tomography system;
   generating a sample image;
   generating composite pixel values from pixel values in the background image; and
   subtracting the composite pixel values from pixel values in the sample image.

6. A method for coherence noise filtering in an optical coherence tomography system, the method comprising:
   generating a background image containing coherence noise;
   generating a sample image by the optical coherence tomography system scanning an optical signal over a sample to generate sample scan fringe data and generating the sample image by performing an inverse Fourier transform on sample scan fringe data;
   generating composite pixel values from pixel values in the background image; and
   subtracting the composite pixel values from pixel values in the sample image.

7. A method for coherence noise filtering in an optical coherence tomography system, the method comprising:
   generating a background image containing coherence noise;
   generating a sample image;
   generating composite pixel values from pixel values in the background image by taking averages of the pixel values in the background image; and
   subtracting the composite pixel values from pixel values in the sample image.

8. A method for coherence noise filtering in an optical coherence tomography system, the method comprising:
   generating a background image containing coherence noise;
   generating a sample image;
   generating composite pixel values from pixel values in the background image by taking averages of the pixel values for lines of the background image; and
   subtracting the composite pixel values from pixel values in the sample image.

9. An optical tomography system comprising:
   a wavelength swept optical source for generating a tunable optical signal;
   an interferometer for transmitting the tunable optical signal from the wavelength swept optical source to a sample arm and reference arm and combining the optical signals from the sample arm and the reference arm to generate an interference signal; and
   a processing system that samples the interference signal to generate a sample image and a background image, generates composite pixel values from pixel values in the background image, and subtracts the composite pixel values from pixel values in the sample image.

10. A system as claimed in claim 9, further comprising a light block in the optical coherence tomography system, the processing system generating the background image by performing an inverse Fourier transform on scan data from the scan of the light block.

11. A system as claimed in claim 9, wherein the processing system generates the background image by cross-correlating different images generated by the processing system.

12. A system as claimed in claim 9, further comprising a scanning system for scanning the tunable optical signal over the sample to generate sample scan fringe data; and the processing system generating the sample image by performing an inverse Fourier transform on the sample scan fringe data.

13. A system as claimed in claim 9, wherein the processing system generates the composite pixel values by taking averages of the pixel values in the background image.

14. A system as claimed in claim 9, wherein the processing system generates the composite pixel values by taking averages of the pixel values for lines of the background image.

15. A system as claimed in claim 9, wherein the processing system subtracts a magnitude of the composite pixel values from magnitudes of the pixel values in the sample image, leaving a phase of the pixel values in the sample image substantially unchanged to generate a corrected sample image.

16. A system as claimed in claim 9, wherein the processing system performs further processing on the corrected sample image based on the phase of the pixel values.

17. A system as claimed in claim 9, wherein the processing system performs Doppler velocity extraction on the corrected sample image based on the phase of the pixel values.

* * * * *